Jan. 23, 1945.　　　B. H. SHINN　　　2,367,829
ADJUSTABLE SEAT
Filed Feb. 12, 1942　　　3 Sheets-Sheet 1
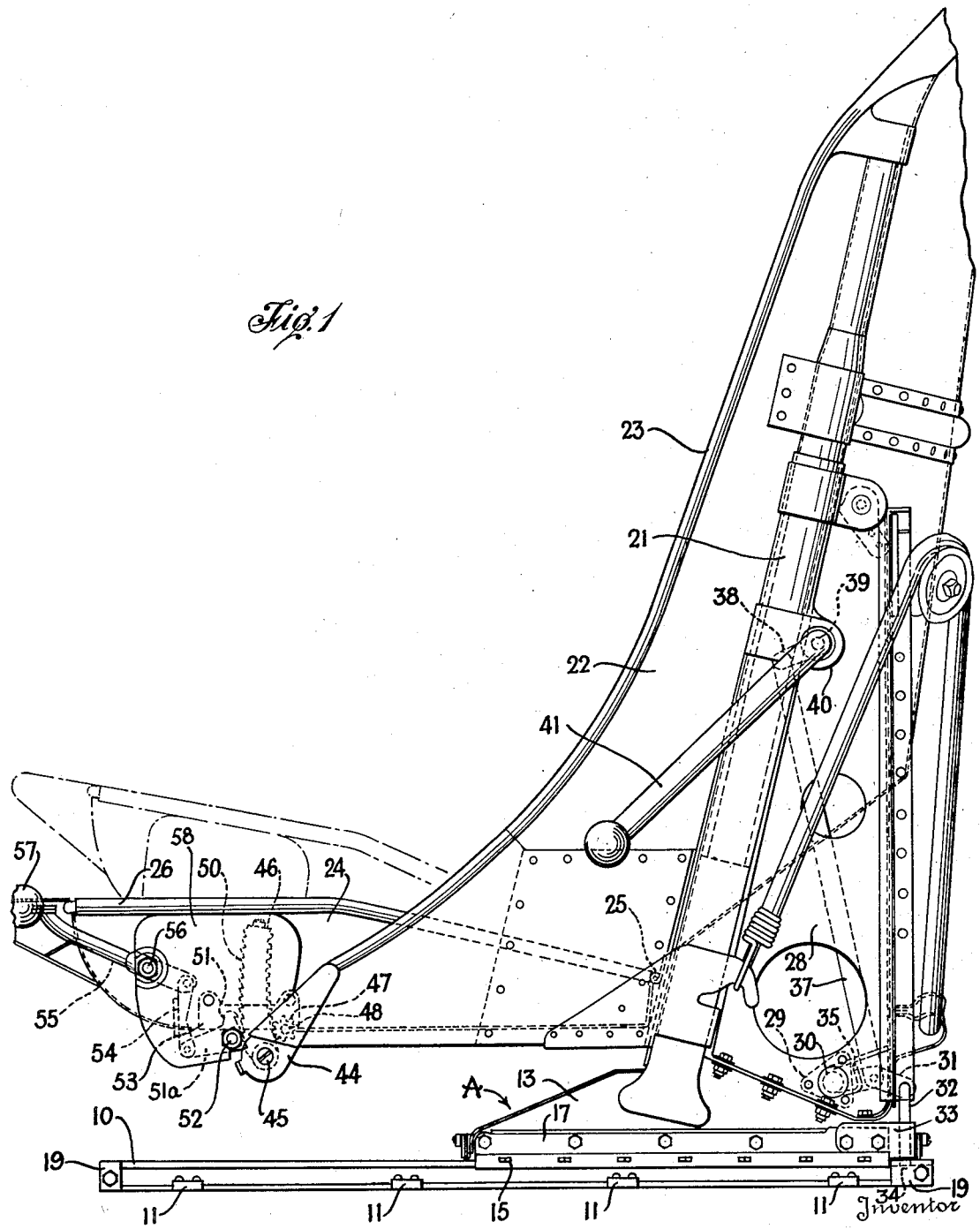
BYRON H. SHINN

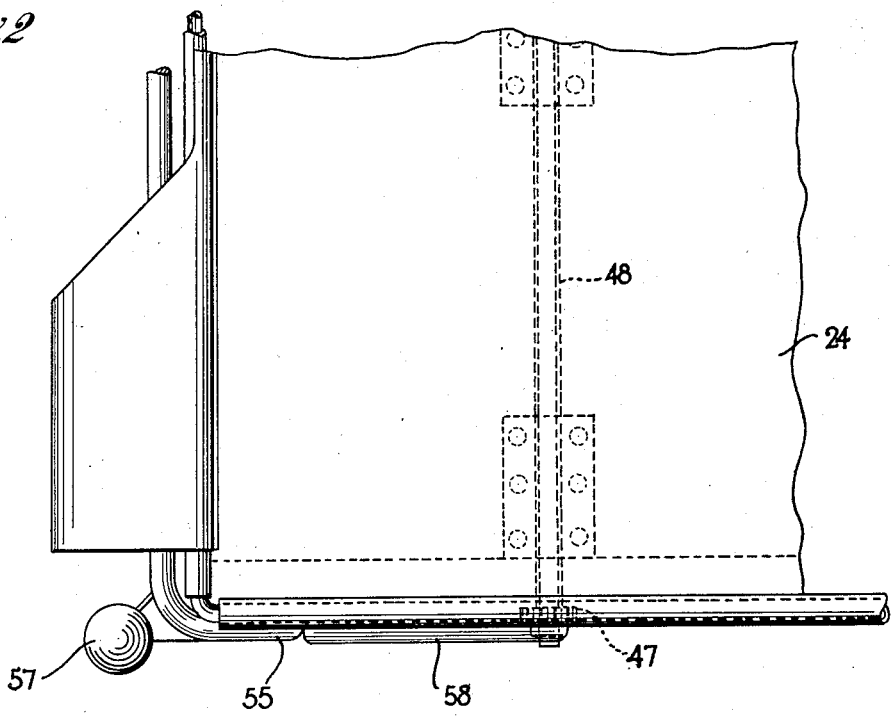
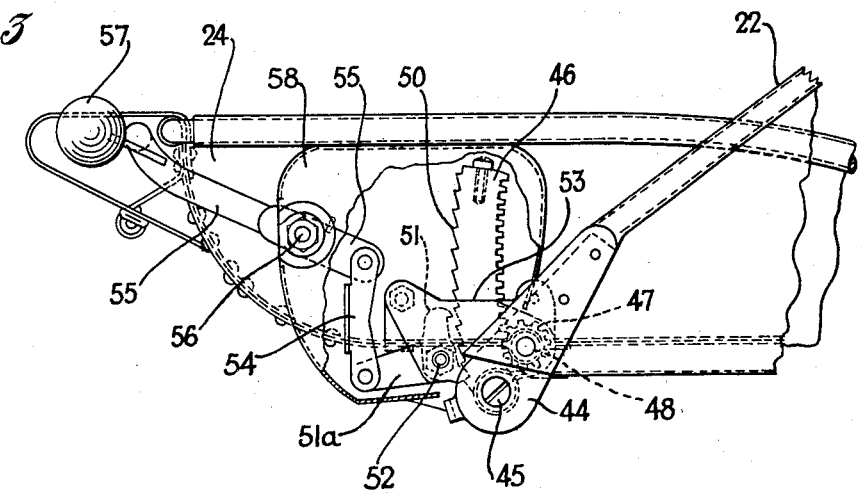

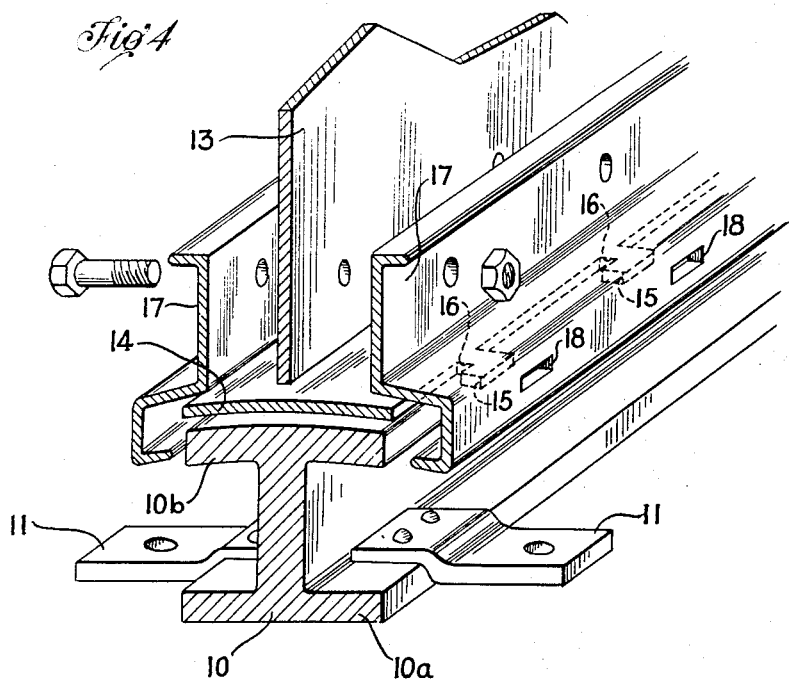
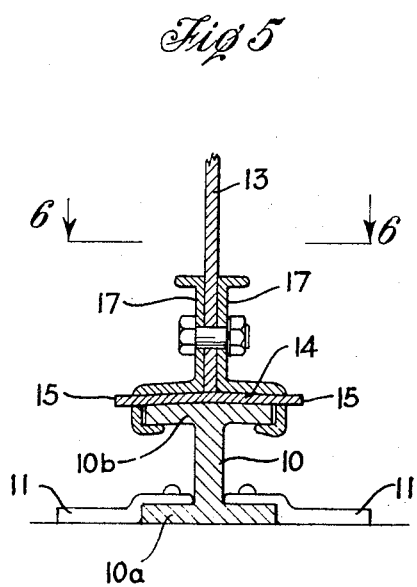
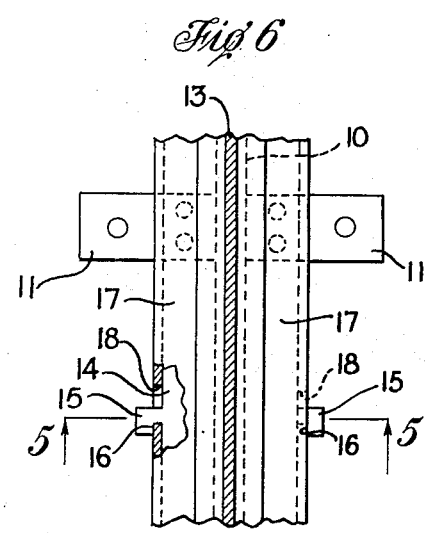

Patented Jan. 23, 1945

2,367,829

UNITED STATES PATENT OFFICE 2,367,829

ADJUSTABLE SEAT

Byron H. Shinn, Butler, Pa., assignor to The Firestone Tire & Rubber Company, Akron, Ohio, a corporation of Ohio Application February 12, 1942, Serial No. 430,579

5 Claims. (Cl. 155—5)

This invention relates to adjustable seats, and more especially it relates to adjustable seats for the drivers of vehicles.

It is a well-known fact that the fatigue of vehicle driving may be relieved, to some extent at least, if the driver is able to change his posture, and this is achieved by means of adjustable seats. Such seats also accommodate the physical peculiarities of the person driving the vehicle, and contribute to the comfort of different drivers who may be required to drive the vehicle. The invention is of especial utility in its application to pilots' seats for airplanes since such seats should be capable of adjustment by the pilot, preferably while seated in the seat, and by the use of only one of his hands.

The chief objects of the invention are to provide in an improved manner for adjusting a seat forwardly or rearwardly; to provide in an improved manner for adjusting the leg-supporting portion of the seat relatively of the back thereof; to provide seat-adjusting means operable alternatively by the right hand or left hand of the driver; to provide a simple and improved slide-rail construction for supporting the seat in a manner that enables fore and aft movement thereof; and to provide an interlock of the seat-carriage and the slide-rail preventing separation thereof when the vehicle is tilted. Other objects will be manifest as the description proceeds.

Of the accompanying drawings:

Figure 1 is a side elevation of an adjustable pilot seat embodying the invention;

Figure 2 is a fragmentary plan view on a larger scale of the leg-supporting portion of the seat;

Figure 3 is a side elevation of the structure shown in Figure 2, a part thereof being broken away to reveal the underlying structure;

Figure 4 is an exploded sectional perspective view, on a larger scale, of one of the slide rails supporting the seat, and the seat structure engaging the slide rail;

Figure 5 is a transverse section on the line 5—5 of Figure 6, of the elements shown in Figure 4 in assembled, operative relation; and Figure 6 is a section on the line 6—6 of Figure 5, a part being broken away to reveal underlying structure.

Referring to Figure 1 of the drawings, there is shown an adjustable seat comprising a pair of carriages, such as the carriage that is designated as a whole by the character A, said carriage resting upon and supported by a track rail 10. It will be understood that there are two track rails 10, the same being of identical construction and arranged in parallelism upon the floor of the vehicle, and parallel to the fore-and-aft center-line of the vehicle, there being a carriage A mounted upon each track rail. As is best shown in Figures 4 and 5, each track rail 10 comprises a base flange 10a that has clips 11, 11 secured thereto, which clips also are secured to the floor of the vehicle for retaining the rail in place. The rail 10 also is formed on its upper margin with a relatively wide head 10b upon which the carriage A is mounted for sliding movement, the top face of the head being slightly transversely convex, and projecting laterally both sides of the central vertical web of the rail.

As shown best in Figures 4 to 6, each carriage A comprises a vertically disposed metal plate 13 that rests upon a transversely arcuate wear plate 14, the latter resting flush upon the arcuate top face of the rail head 10b. The width of the wear plate 14 is slightly greater than the width of the rail head, and at spaced points longitudinally of the plate the opposite margins thereof are formed integrally with laterally projecting ears 15, 15, which ears are notched on one side thereof, as shown at 16, 16. The wear plate is removably secured to the plate 13 by means of a pair of guide plates 17, 17 that are bolted to the opposite sides of plate 13 at the lower margin thereof, and which are so shaped as to embrace the respective lateral margins of the wear plate 14 and to stand in slightly spaced relation to the lateral marginal faces of the head 10b of the track rail, the marginal portions of the guide plates being folded onto the under face of said rail head 10b so as to hold the carriage to the rail. The portion of each guide plate 17 that embraces a margin of the wear plate 14 is formed with slots 18 to receive the respective ears 15 of the wear plate and to interlock therewith through the agency of the notches 16 of said ears, as is clearly shown in Figure 6, when the wear plate is moved longitudinally, relatively of said guide plates. The arrangement is such as to reinforce said guide plates against spreading. Stop-blocks 19, 19, Figure 1, are bolted to opposite sides of the rail 10, at each end thereof to limit sliding movement of the carriage A longitudinally of the rail 10. Means presently to be described is provided for selectively locking the carriage to the rail at different points longitudinally thereof.

A tubular, longitudinally arcuate bracket or column 21 has its opposite ends secured to the plates 13 of the respective carriages A, said column supporting a metal seat back 22 that is concavo-convex in shape with its concave side facing the front of the vehicle. The concave side of the seat back 22 is suitably upholstered, which upholstery may extend around the margins thereof as shown at 23. The leg supporting portion or "bucket" 24 of the seat is pivotally supported at 25 from the seat back 22, means subsequently to be described being located near the front of said leg supporting portion for moving the same about said pivot to alter its angular position with relation to the seat back 22 and to the floor. Upholstery for the seat portion 24 is shown at 26.

Secured to the top of each carriage A and to the seat back 22 is a reinforcing plate, such as the plate 28, Fig. 1. Mounted upon the confronting faces of the plates 28 are respective bearing brackets, such as the bracket 29, in which brackets the end portions of a rock shaft 30 are journaled. Secured to each end of the latter are respective lever arms, such as the lever arm 31, and pivotally carried at the free end of each of the latter is a downwardly projecting locking pin 32. The locking pins 32 are slidably disposed in suitable vertical bores in respective guide blocks 33 that are secured to the respective carriages A, at the rear ends thereof, directly over the respective track rails 10. The lower ends of the locking pins 32 are receivable in vertical sockets or recesses, such as the recess 34, Figure 1, that are formed in the heads 10b of the track rails 10, each rail comprising a longitudinally extending series of such recesses 34. The recesses 34 in the two rails 10 are transversely aligned with each other, as are the locking pins 32, so that the latter are concurrently receivable in recesses 34. The seat is secured in different positions longitudinally of the vehicle when the locking pins 32 are positioned in different recesses 34. The carriages A are readily pushed in either direction along the rails 10 when the locking pins are lifted from the said recesses. Because both lever arms 31 are secured to the rock shaft 30, it will be apparent that the lifting of either lever arm will effect the lifting of both locking pins. Each lever arm 31 is engaged by a torsion spring 35 that normally urges its free end downwardly, whereby the locking pins 32 are yieldingly held in the recesses 34 of the rails 10.

For withdrawing the locking pins 32 concurrently from their sockets 34, one of the lever arms 31 has a link 37, Fig. 1, pivotally connected at one of its ends thereto. The other end of the link 37 is pivotally connected to the free end of a lever 38 that is secured to one end of a rod 39 that is journaled in a bracket 40 that is attached to the column 21 on one side of the seat, there being a manually operable lever or crank 41 mounted on the other end of said rod 39 for turning the latter. The arrangement is such that the lifting of the hand crank 41 will effect the lifting of both locking pins 32. The hand crank 41 may be positioned on either side of the seat and connected to either of the lever arms 31 as desired.

For enabling the leg supporting portion or bucket of the seat readily to be manually adjusted, the forward portion of the back 22 has its opposite sides provided with respective brackets, such as the bracket 44, and supported from its ends in said brackets is a shaft or rod 45, the same being disposed below the bucket. Mounted upon each end of the rod 45 is a rack, such as the rack 46, which racks extend upwardly from said rod and are disposed beside the lateral faces of the bucket. The racks are swiveled at their lower ends upon the rod 45 so as to be capable of some angular movement relatively thereof. The racks 46 are longitudinally arcuate about an axis coincident with the pivot or hinge 25, and have their concave margins disposed rearwardly, said concave margins being formed with the usual rack teeth as shown. Meshed with said rack teeth are respective pinions, such as the pinion 47, which pinions are fixed to a shaft 48 that is carried by the bucket 24 and journaled at its respective ends in the opposite side walls of the bucket.

The convex margin of each rack 46 is formed with ratchet teeth 50, and operatively engaging the latter is a double pawl or escapement device 51 that is pivotally mounted at 52, between the outer wall of the bucket and a guard plate 53 that is secured to the latter and overlies said pawl and rack. The pawl 51 has two teeth or pallets, one at each end thereof, and the distance between said teeth is greater than three ratchet teeth 50 but less than four ratchet teeth. The teeth of the pawl 51 are adapted to engage the ratchet teeth 50 in alternation as the pawl is manually oscillated upon its pivotal mounting 52, and the weight of a person seated in the bucket 24 urges the latter and the pawl 51 downwardly, relatively of the back 22 and the rack 46. The bucket is elevated when it is manually lifted, at which time the pawl teeth ratchet freely over the ratchet teeth 50. In the drawings the bucket is shown in its lowermost position, its elevated position being indicated in broken lines in Fig. 1. For oscillating the pawl 51 as described, a forwardly projecting arm 51a is formed thereon, the free end of said arm being pivotally connected to one end of a link 54 that has its other end pivotally connected to one end of a lever 55 that is pivotally mounted at 56 on the side wall of the bucket 24. The other end of lever 55 extends forwardly toward the front of the bucket, and therebeyond extends laterally across the front of the bucket as shown in Fig. 2, its far end portion being identical with the near end portion shown, and being pivotally mounted in the manner shown at 56. The far end of the lever 55 also connects with a pawl, and the latter cooperates with the other rack 46 in the manner described. The forward corners of the lever 55 are provided with respective knobs or handles, such as the knob 57, whereby the lever may be oscillated upon its pivots 56 by an occupant of the seat, who may use either hand for the purpose. The presence of the two pinions 47 on a common shaft 48 assures that the opposite sides of the bucket 24 will move upwardly or downwardly in unison, thus obviating transverse tilting of the bucket. Preferably the links 54, pawls 51, and racks 46 are covered by respective guard plates, such as the plate 58.

The feature of swivelling the the racks 46 on the rod 45 makes it unnecessary to fixedly secure their upper ends to the brackets 44, so that the racks will be concentric with the pivot hinge 25. This simplifies the mounting of the rack and the construction of the brackets, and makes the racks less likely to be sprung out of position. One tooth of each pawl or escapement device 51 always is in engagement with the ratchet teeth 50 whereby the racks 46 are confined between said pawls and the pinions 47 and the rack teeth maintained in mesh with the latter, the racks thereby automatically assuming positions concentric with the pivot hinge 25 by reason of their swivel mounting.

From the foregoing it will be apparent that the improved seat is readily adjustable to suit the convenience of the occupant, while the occupant is seated therein, and that it achieves the other advantages set out in the foregoing statement of objects.

Modification may be resorted to without departing from the spirit of the invention or the scope thereof as defined by the appended claims.

What is claimed is:

1. An adjustable seat comprising a seat back, a seat bucket hinged at its rear margin thereto, said seat back extending each side of the bucket toward the front thereof, a toothed ratchet carried by the seat back, a pawl structure carried by the seat bucket and formed with two teeth thereon, which teeth are spaced a fixed distance apart, the distance between adjacent ratchet teeth being an aliquant part of the distance between the said pawl teeth, and means operatively connected to said pawl and operable by an occupant of the seat for oscillating said pawl, whereby the ratchet is engaged by the pawl-teeth in alternation to effect lowering of the bucket by increments of less extent than one ratchet tooth.

2. An adjustable seat comprising a seat back, a seat bucket hinged at its rear margin thereto, said seat back extending each side of said bucket toward the front thereof, a pair of ratchets pivotally connected at one of their ends to the seat back and disposed at opposite sides of the bucket, said ratchets being longitudinally arcuate about axes coincident with the bucket hinge, pawl structures carried by the bucket on opposite sides thereof operatively engageable with the respective ratchets, rotatable means carried by the seat back and engaging the respective ratchets on the opposite sides thereof from said pawl structures, and manually operable means for concurrently oscillating both of said pawls to effect lowering of the free end of the bucket by successive increments.

3. An adjustable seat comprising a seat back, a seat bucket hinged at its rear margin thereto, said seat back extending each side of said bucket toward the front thereof, a pair of ratchets carried by the seat back disposed at opposite sides of the bucket, pawl structures carried by the bucket on opposite sides thereof operatively engageable with the respective ratchets, manually operable means for concurrently oscillating both pawls to effect lowering of the bucket, and means carried by the bucket and engaging elements carried by the seat back for assuring that opposite sides of the bucket move in unison, said means comprising a rotatable shaft extending transversely of the bucket, pinions fixedly mounted thereon near its respective ends, and rack teeth formed on one margin of each ratchet structure, which racks are meshed with respective pinions.

4. An adjustable seat comprising a seat back, a seat bucket hinged at its rear margin thereto, said seat back extending each side of said bucket toward the front thereof, a pair of ratchets carried by the seat back at opposite sides of the bucket, each ratchet being longitudinally arcuate about an axis coincident with the bucket hinge, the ratchet teeth being formed on one margin thereof, means pivotally mounting each ratchet on the seat back at one end of the ratchet, pawl structures carried by the bucket on opposite sides thereof operatively engageable with the respective ratchets, manually operable means for concurrently oscillating both pawls to effect lowering of the bucket, and means carried by the bucket having rolling engagement with other margins of the respective ratchet structures to confine the latter between itself and said pawls.

5. A combination as defined in claim 4 wherein the last mentioned means comprise pinions that are meshed with rack teeth formed on each ratchet structure.

BYRON H. SHINN.